United States Patent [19]

Nedachi

[11] Patent Number: 5,588,329
[45] Date of Patent: Dec. 31, 1996

[54] SNAP TOGETHER SHIFT KNOB CONSTRUCTION

[76] Inventor: Mitsuyuki Nedachi, 16-21 Ohsugi 1-chome, Edogawa-ku, Tokyo, Japan

[21] Appl. No.: 386,317

[22] Filed: Feb. 9, 1995

[51] Int. Cl.$^6$ .................................................. B60K 23/00
[52] U.S. Cl. ........................... 74/473 R; 74/543; 403/326
[58] Field of Search ............................... 403/329, 326; 74/473 R, 491, 519, 543

[56] References Cited

U.S. PATENT DOCUMENTS

| | | | |
|---|---|---|---|
| 2,496,700 | 2/1950 | Cole | 403/326 |
| 4,791,826 | 12/1988 | Behrens | 74/543 |
| 4,876,914 | 10/1989 | Kanno | 74/543 |
| 5,284,400 | 2/1994 | Thomas | 74/543 |

FOREIGN PATENT DOCUMENTS 647379  2/1989  Japan .

*Primary Examiner*—Charles A. Marmor
*Assistant Examiner*—David Fenstermacher
*Attorney, Agent, or Firm*—Ronald P. Kananen

[57] ABSTRACT

A mounting construction ensures to fix a shift knob to a lever shaft easily and promptly with a single assembly operation. The lever shaft 1 is formed with a circumferential groove 1a therein and has a rotation-prohibiting projection 1g thereon. A support body 2 is formed with first fastening clicks 2d and 2d and second fastening clicks 2e and 2e, which first and second clicks project on an upper end portion thereof. The support 2 is formed with a rotation preventing groove 2f at a lower end portion thereof, which groove 2f engages the rotation preventing projection 1g. The lever shaft 1 is inserted into the support body 2 so that the fastening clicks 2d and 2d of the support body 2 engage the circumferential groove 1a in the lever shaft 1 to securely fix to the lever shaft 1. The shift knob 3 is provided with a blind hole 3b and horizontally extending engagement holes 3c at a lower portion of the shift knob 3. Simply pushing the shift knob 3 into the lever shaft 1 causes the first fastening clicks 2d and 2d to engage the engagement holes 3c with a single assembly operation.

1 Claim, 7 Drawing Sheets

SNAP TOGETHER SHIFT KNOB CONSTRUCTION

BACKGROUND OF THE INVENTION

1. Field of the Invention

The present invention relates to a mounting construction of an operating knob where the knob body may be fixed to a lever shaft with a single assembly operation.

2. Prior Art

Japanese Utility Model Publication No. 64-7379 discloses a conventional mounting construction of an operating knob. As shown in FIG. 6, the mounting construction has a male screw 6a at the tip end of a shift lever 6 and a female screw 7a in a shift knob. The shift knob 7 is secured to the shift lever 6 by threading the shift knob 7 into the tip end portion of the shift lever 6. Assembling the prior art operating shift is rather time consuming and such mounting construction does not lend itself to mass production of a knob having a shift lever.

Improperly threading the shift knob 7 into the shift lever 6 can cause damage to the male threads and female threads. This can cause loose connection of the shift knob 7 to the shift lever 6, and the shift knob 7 may even drop from the shift lever 6.

Forcibly threading the shift knob 7 into the shift lever 6 in an improper manner, may cause fracture of the shift lever 6 or crack in the shift knob 7.

SUMMARY OF THE INVENTION

To solve the aforementioned problems, the present invention provides a construction comprising a lever having a circumferential groove and a rotation-prohibiting projection; a support body having first fastening clicks that engage fastening holes in the shift knob, second fastening clicks that engage the circumferential groove, and a rotation-prohibiting groove that engages the rotating-prohibiting projection; and a shift knob formed with fastening holes which the first fastening clicks engage. The first fastening clicks, second fastening clicks, and rotation-prohibiting groove are formed integrally continuous with the support body.

In addition to the aforementioned construction, a construction is employed where a shift knob serves as a push button for the side brake of an automotive vehicle.

BRIEF DESCRIPTION OF THE DRAWINGS

Features and other objects of the present invention will become more apparent from the description of preferred embodiments with reference to the accompanying drawings in which.

DETAILED DESCRIPTION OF THE PREFERRED EMBODIMENTS

Embodiment

Figure 1:
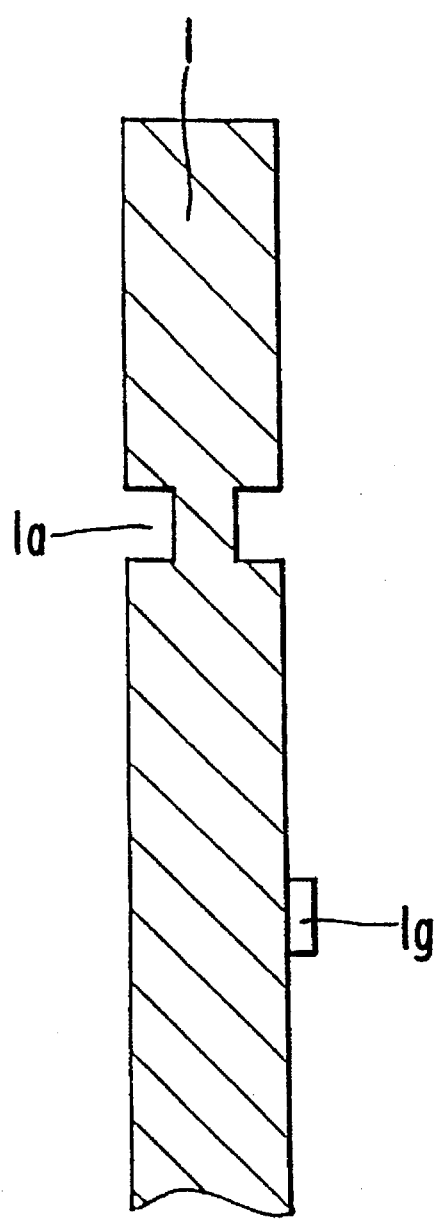
FIG. 1 is a side view showing a lever shaft of a first embodiment of the present invention.
Figure 2:
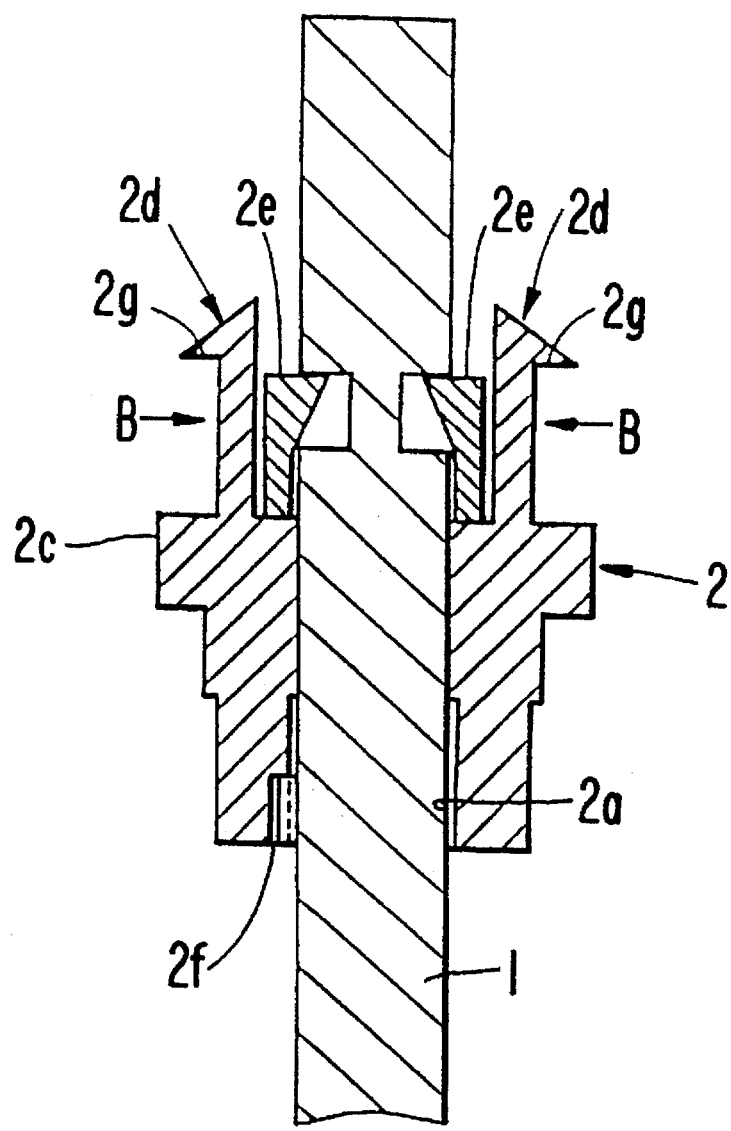
FIG. 2 is a vertical cross-sectional view of the first embodiment where a support body is fixed to the lever shaft.

A first embodiment of the invention will be described in detail with reference to FIGS. 1–4.

A lever shaft 1 is made of a metal in the shape of a round bar. The lever shaft 1 is formed with a circumferential groove in an outer surface thereof, which circumferential groove serves as a fastening member. A support body 2 is formed of a resin and the lever shaft 1 is securely fitted into the support body 2. The support body 2 is of a generally cylindrical shape and is provided with an axial through hole 2a in the center thereof. The support body 2 is formed with a flange 2c on the upper portion thereof. The support body 2 has two first fastening clicks 2d and 2d which are diametrically opposed on the upper outer circumference of the support body 2 and project outwardly of the support body 2. Likewise, two opposed second fastening clicks 2e and 2e are aligned on the inner circumference of the support body 2 and project inwardly. The support body 2 has a cutout at a lower portion thereof which serves as a rotation-prohibiting groove 2f for the lever shaft 1.

The lever 1 has a rotation-prohibiting projection 1g secured to the outer circumference thereof. A shift knob 3 is formed of a resin and is of a generally cylindrical shape similar to the support body 2. The top of the shift knob 3 having a dent 3a that looks like a lid, and closes the cylindrical shift knob 3 to form a blind hole 3b. The shift knob 3 has an engagement hole 3c that extends horizontally at the lower end portion of the shift knob 3.

Assembly procedure of the shift knob to the lever shaft will be described as follows: First, the lever shaft 1 is inserted into the through hole 2a of the support body 2. During the insertion of the lever shaft 1 into the support body 2, the lever shaft 1 advances into the support body 2 while caming the second fastening clicks 2e and 2e outwardly of the support body 2. Thus, the second fastening clicks 2e and 2e yieldably deflect outwardly as the lever shaft 1 further advances, and then drop into the circumferential groove 1a so that the support body 2 is secured to the lever shaft 1. The rotation-prohibiting projection 1g of the lever shaft 1 fits to the rotation-prohibiting groove 2f in the support body 2, so that the support body 2 is prevented from rotating relative to the lever shaft 1.

Figure 3:
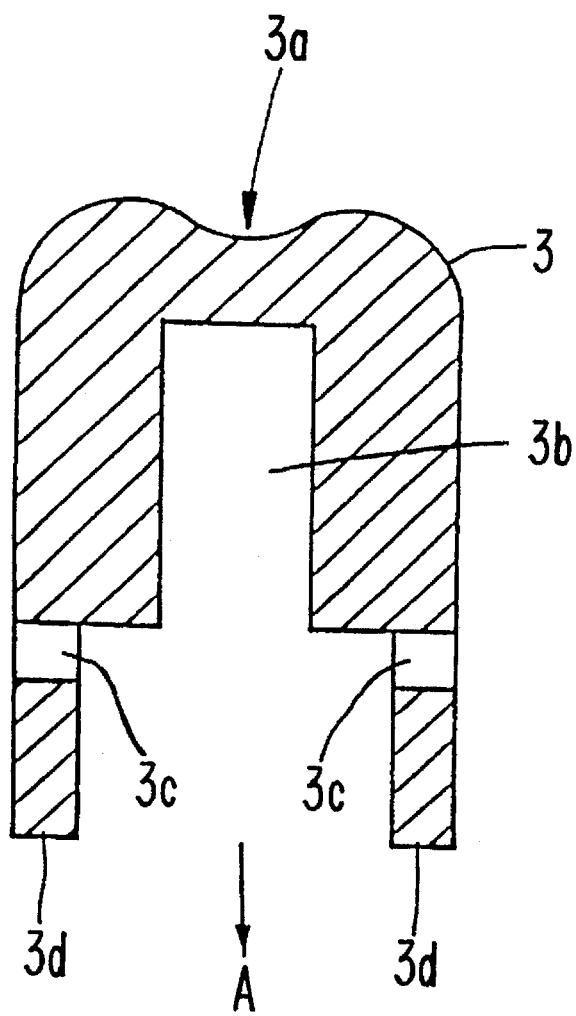
FIG. 3 is a vertical cross-sectional view showing a shift knob of the first embodiment of the present invention.

Then, the upper end portion of the lever shaft 1 is inserted into the blind hole 3b in the shift knob 3 in FIG. 3 until lower ends 3d of the shift knob 3 abut the first fastening clicks 2d and 2d. The first fastening clicks 2d and 2d are made of a resilient material and yieldably deflect toward each other, i.e., in the direction of arrow B as the shift knob 3 is pushed in the direction of arrow A so that the lever shaft 1 may advance further into the shift knob 3. Then, the first fastening clicks 2d and 2d regain their original position due to their resiliency so that hooks 2g and 2g fit into the engagement holes 3c.

Figure 4:
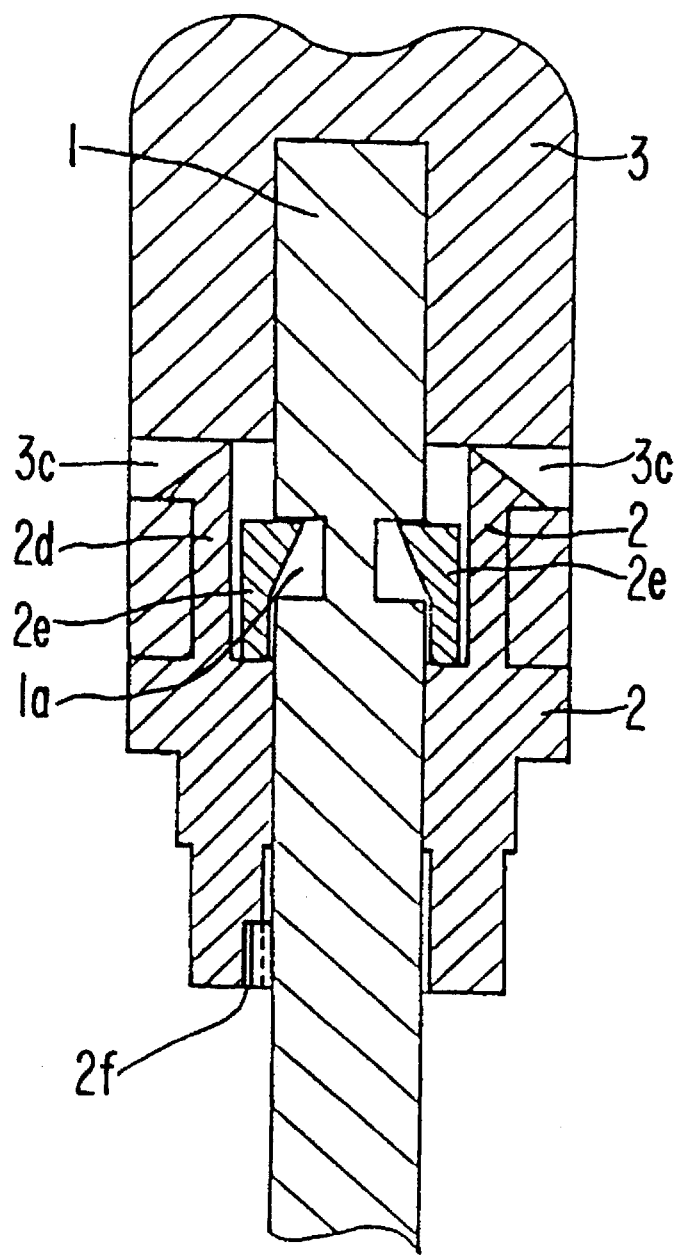
FIG. 4 is a vertical cross-sectional view where the shift knob of the invention is assembled to the shift lever with a single assembly operation.

FIG. 4 illustrates the hooks 2g and 2g fitted into the engagement holes 3c. As shown in FIG. 4, the shift knob 3 may be fixed to the support body 2 having the lever shaft 1 by pushing the shift knob 3. An application of a shift knob 3 having a lever shaft according to the present invention will be described with reference to FIG. 5.

Figure 5:
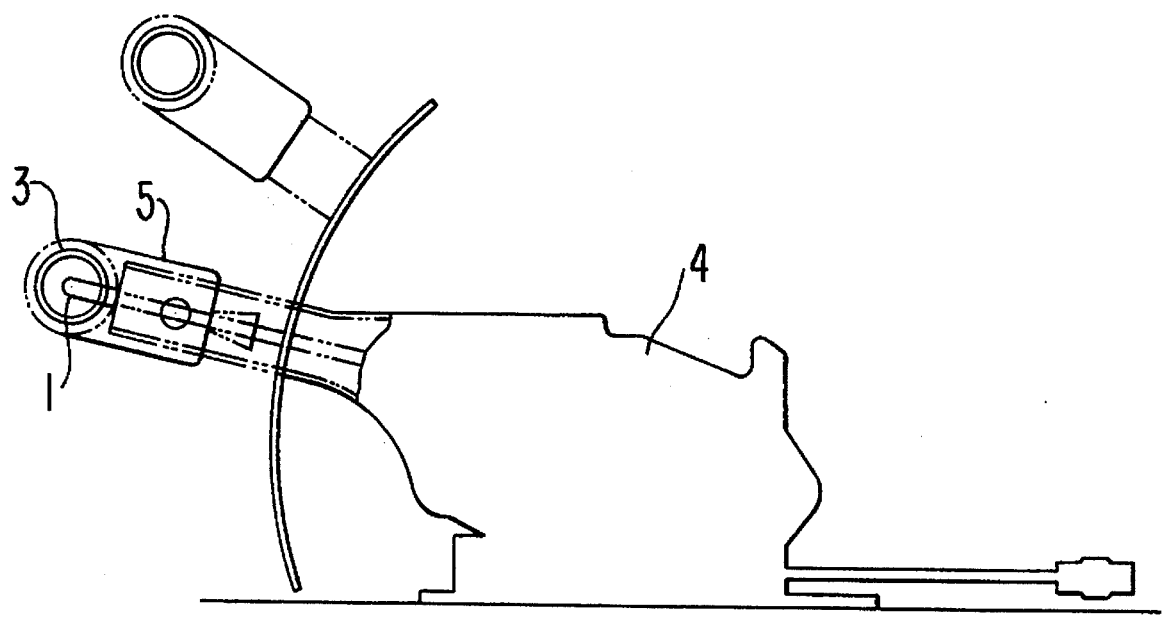
FIG. 5 is an illustrative diagram showing a shift knob having a lever shaft according to the present invention is used as a push button for a side brake of an automotive vehicle.
Figure 6:
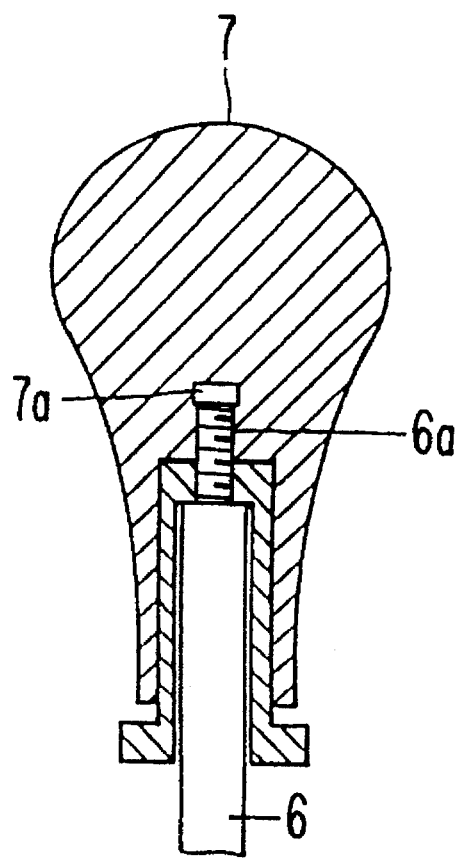
FIG. 6 is a vertical side view showing an example of a conventional mounting construction of an operating knob.

FIG. 5 illustrates a construction of a side brake of an automotive vehicle. A parking or so-called "side" brake 4 is arranged beside the driver's seat. A grip 5 is provided with a shift knob 3 of the invention at the tip end thereof. In the figure, the lever shaft is shown at 1. The driver pulls the grip 5 up to a position depicted by dash dot lines when the vehicle stops and/or is parked, and moves it down to a position depicted by solid lines when the vehicle runs.

While a shift knob 3 having a lever shaft of the invention has been described with respect to, for example, a side brake for an automotive vehicle, the invention may of course be applied to a variety of shift knobs. In fact, the scope of the invention will cover every shift knob having a lever shaft.

Figure 7:
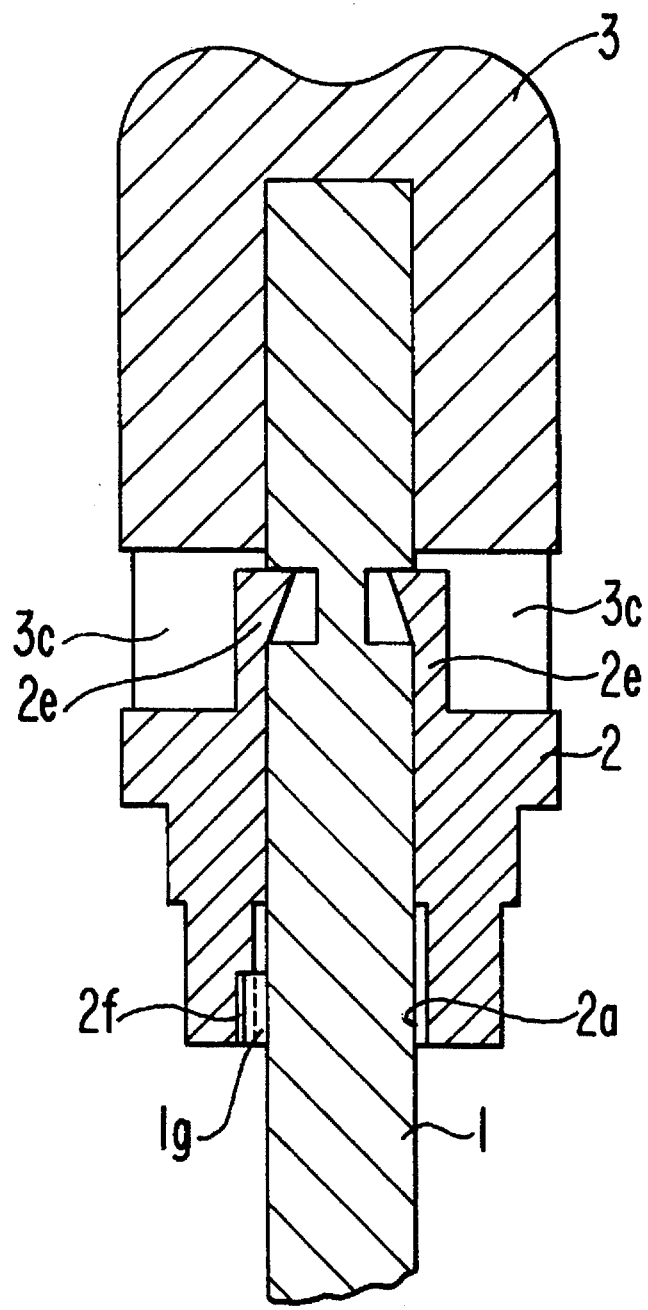
FIG. 7 is a vertical cross-sectional view showing a second embodiment of a shift knob having a shift lever according to the present invention.

FIG. 7 illustrates a second embodiment of the invention. In the figure, the support body 2 may be formed of a resin integrally continuous with the shift knob 3. The support body 2 is provided with a pair of fastening clicks 2e and 2e, which engage a circumferential groove 1a provided in the lever shaft 1 so that the shift knob 3 may be fixed to the lever shaft 1 with a single assembly operation. This allows a simple construction of the support body 2 and facilitates the manufacture of a shift knob having a shift lever. In the figure, fastening holes 3c allows the fastening clicks 2e and 2e to deflect outwardly as the lever shaft 1 advances into the shift knob 3. A rotation-prohibiting groove 2f engages the rotation-prohibiting projection 1g to prevent the lever shaft 1 from rotating.

With a mounting construction of an operating knob of the invention as mentioned above, the shift knob is fixedly mounted to the lever shaft by a single assembly operation, which facilitates mounting procedure of a shift knob and ensures prompt assembly of the shift knob to the lever shaft. This construction prevents the threads of the shift knob and lever shaft from being damaged, and lends itself to mass production of a shift knob having a shift lever. In addition to a push button knob of a side brake for automotive vehicle, a shift knob having a lever shaft of the invention may be applied to variety of shift knobs having a lever shaft.

What is claimed is:

1. A mounting structure for connecting a knob to a shaft, comprising:

a rotation preventing projection formed on a side of shaft;

a first sleeve disposed on the shaft, said first sleeve having a groove for receiving said rotation preventing projection and for preventing relative rotation between the shaft and said first sleeve, said first sleeve having an annular shoulder portion from which first fastening clicks project in a spaced essentially parallel relationship with the shaft;

means defining annular recess in the shaft;

a second sleeve disposed on said shaft so as to seat on the annular shoulder, said second sleeve having second fastening clicks which engage in said annular recess and lock both said first and second sleeves axially in position on the shaft; and means defining recesses in the walls of a bore formed in the knob into which the first clicks can engage to lock the knob on the shaft.

* * * * *